(12) United States Patent
Mang et al.

(10) Patent No.: US 7,591,378 B2
(45) Date of Patent: Sep. 22, 2009

(54) MANUALLY GUIDED APPARATUS FOR COLLECTING FRUITS OR NUTS

(75) Inventors: Harald Mang, Winnender (DE); Georg Maier, Kernen (DE); Wolfgang Layher, Waiblingen (DE); Alexander Erkert, Korb (DE); Marc Mildner, Alfdorf (DE)

(73) Assignee: Andreas Stihl AG & Co. KG (DE)

( * ) Notice: Subject to any disclaimer, the term of this patent is extended or adjusted under 35 U.S.C. 154(b) by 512 days.

(21) Appl. No.: 11/349,698

(22) Filed: Feb. 8, 2006

(65) Prior Publication Data

US 2006/0180513 A1 Aug. 17, 2006

(30) Foreign Application Priority Data

Feb. 12, 2005 (DE) .................. 10 2005 006 422

(51) Int. Cl.
*B07B 1/49* (2006.01)

(52) U.S. Cl. .................. 209/417; 209/420; 209/421; 56/10.1; 56/12.5; 56/14.8

(58) Field of Classification Search .................. 209/417, 209/420, 421; 56/10.1, 12.5, 14.8, 16.5
See application file for complete search history.

(56) References Cited

U.S. PATENT DOCUMENTS 2,552,382 A 5/1951 Root

| | | |
|---|---|---|
| 2,933,748 A | 4/1960 | Parker et al. |
| 3,308,613 A | 3/1967 | Davidson |
| 3,591,883 A | 7/1971 | Armstrong et al. |
| 4,601,163 A * | 7/1986 | Trelford ..................... 56/16.7 |
| 4,982,559 A * | 1/1991 | Calais ....................... 56/328.1 |
| 5,121,592 A * | 6/1992 | Jertson ........................ 56/344 |
| 5,168,692 A * | 12/1992 | Dudley ..................... 56/328.1 |
| 5,375,402 A * | 12/1994 | Gidge ....................... 56/328.1 |

* cited by examiner

*Primary Examiner*—Patrick H Mackey
*Assistant Examiner*—Terrell H Matthews
(74) *Attorney, Agent, or Firm*—Robert W. Becker; Robert W. Becker & Assoc.

(57) ABSTRACT

A manually guided apparatus for collecting objects, especially fruits and nuts, including a pick-up drum rotatably mounted in the drum chamber of a housing. The drum is disposed approximately transverse to the direction of operation, and is rotationally driven by a drive unit. The housing has a wall section extending over the width of the drum approximately at the level of the outer diameter thereof. A ground support is disposed in the region of ends of the drum. A collection channel provides communication for picked-up objects between the drum chamber and a collection receptacle for receiving the objects. The wall section of the housing and the drum cooperate with one another such that objects are accelerated along the wall section toward the collection channel and are ejected out of the drum chamber along a trajectory into the collection receptacle. A handle is operatively connected to the housing for moving the housing in the direction of operation.

24 Claims, 7 Drawing Sheets

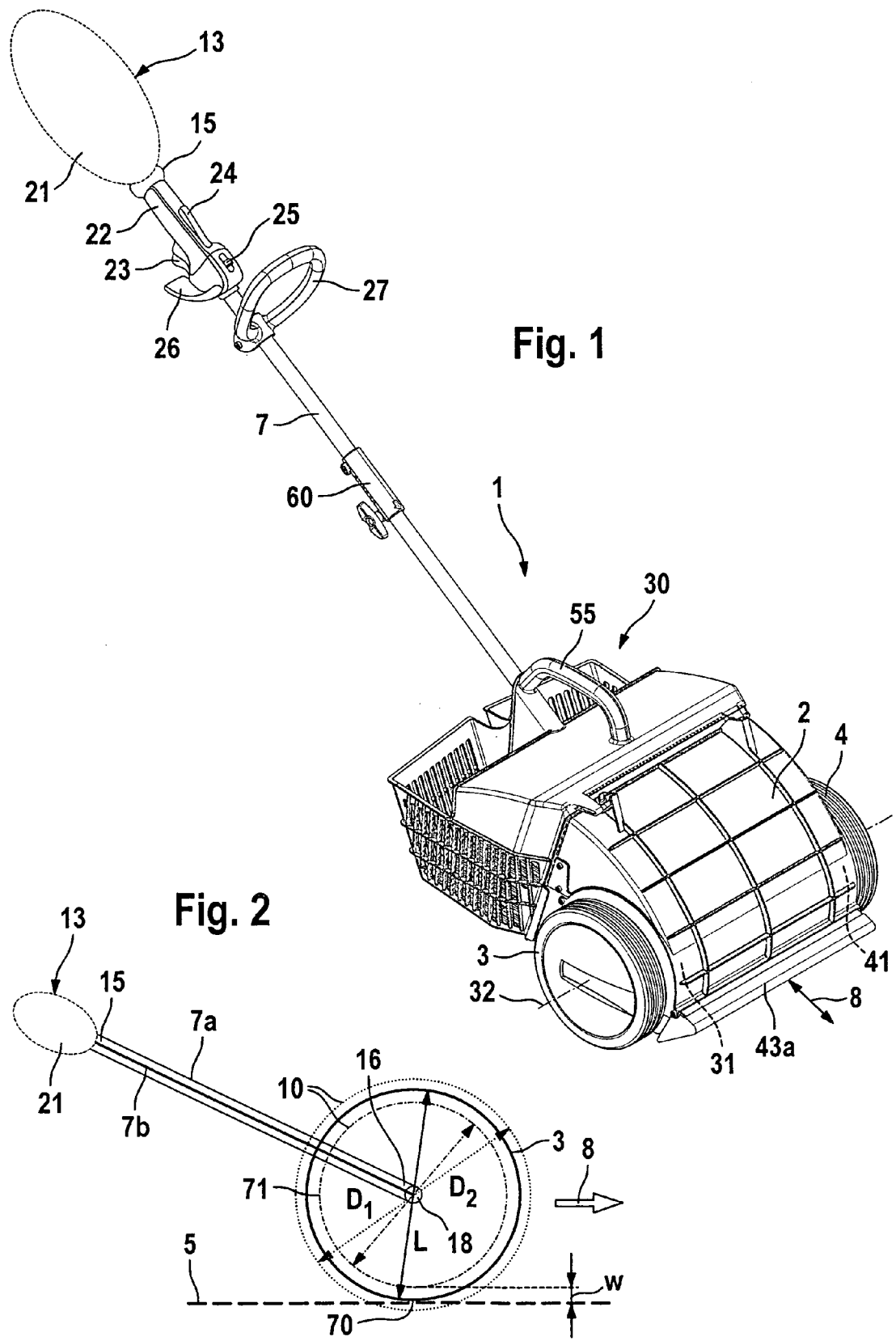

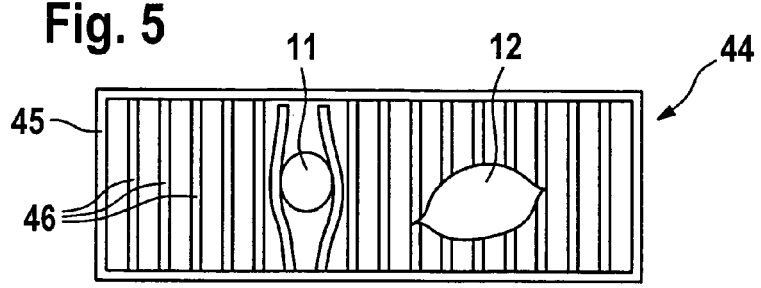
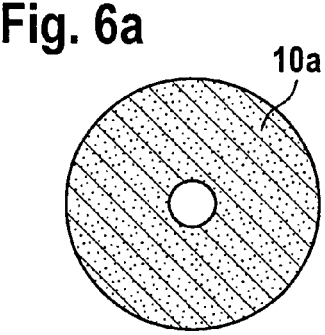
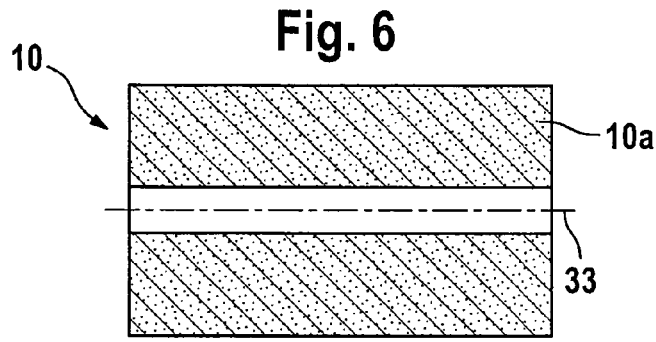
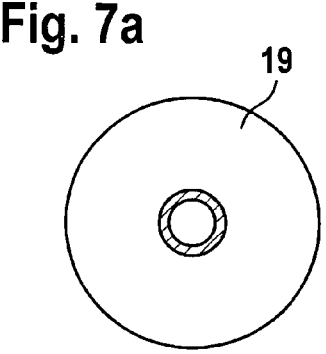
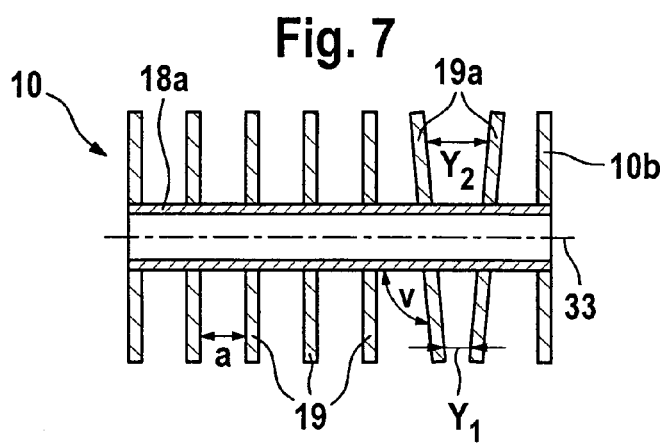
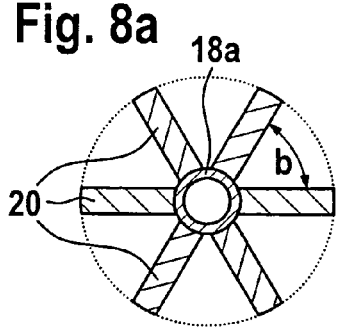
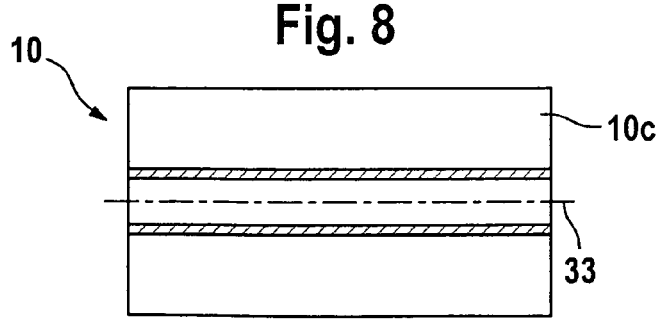

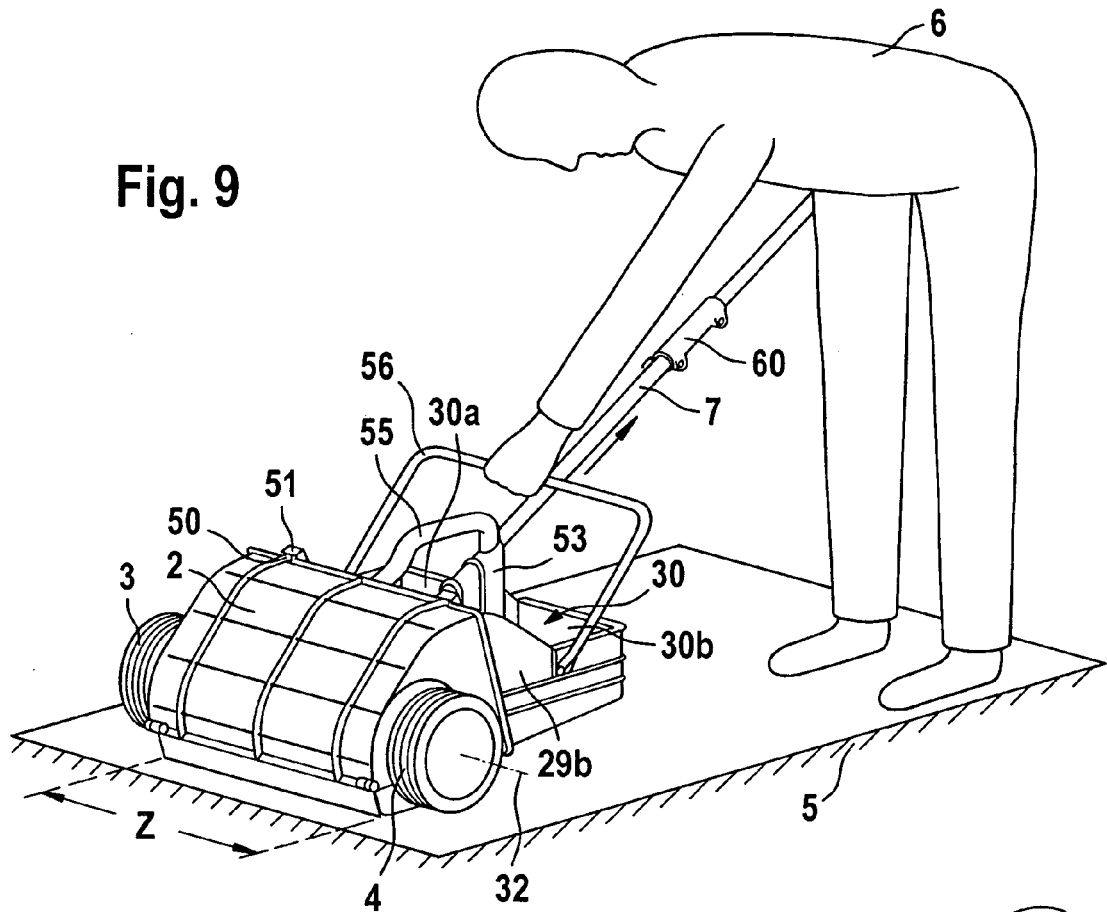
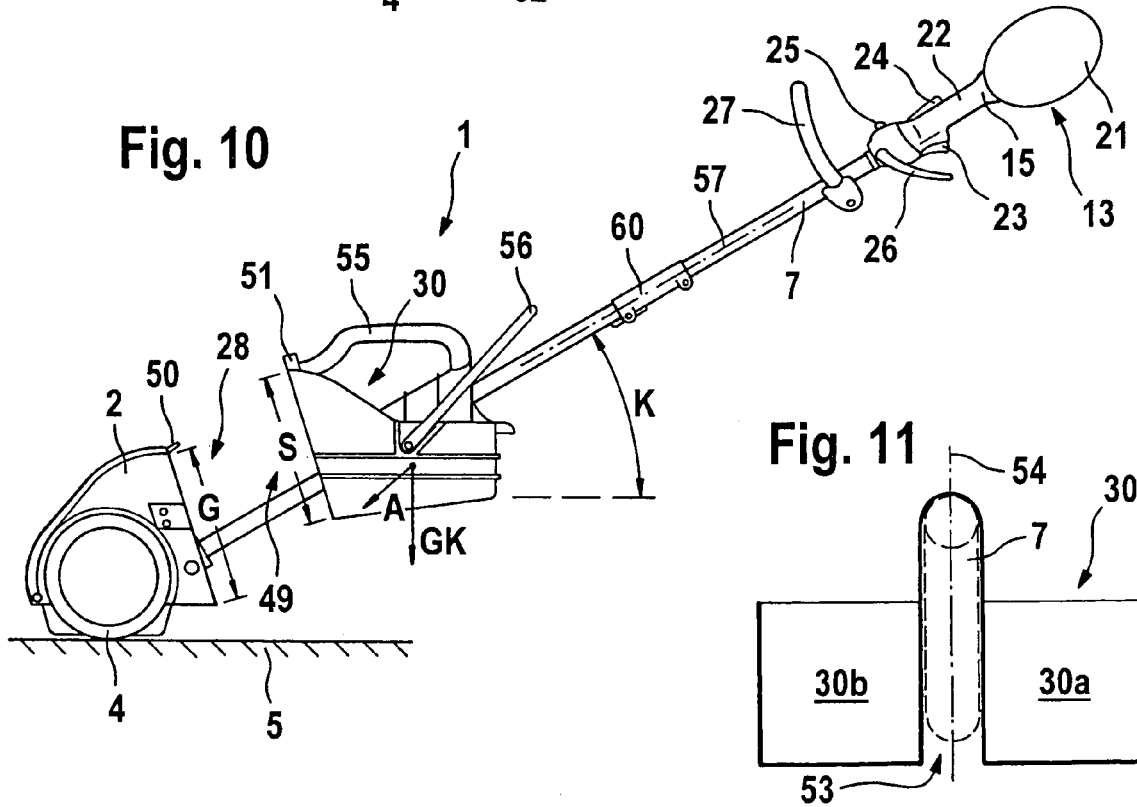
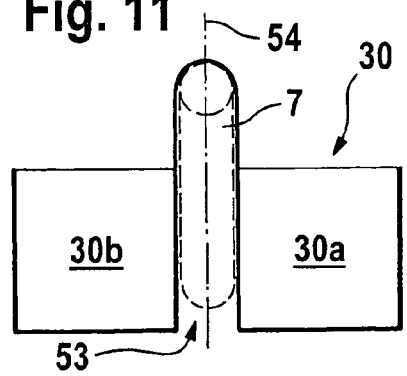

MANUALLY GUIDED APPARATUS FOR COLLECTING FRUITS OR NUTS

The instant application should be granted the priority date of 12 Feb. 2006, the filing date of the corresponding German patent application 10 2005 006 422.1.

BACKGROUND OF THE INVENTION

The present invention relates to a manually guided apparatus for picking up, sweeping up, or otherwise collecting objects, especially fruits or nuts, such as apples, chestnuts, olives, coffee berries, or the like.

Such an apparatus is known from U.S. Pat. No. 4,982,559. Rotatably mounted in the forward region of a housing that is supported on the ground by wheels is a sweeper drum for sweeping up nuts. The housing is provided as a supporting chassis for a drive motor, and is in the form of a three-wheeled mechanism. The sweeper drum is disposed transverse to the direction of operation, and sweeps the nuts that are to be picked up according to the sweeping principle, whereby the nuts fall into a basket that can be placed into the housing, at the end of the sweeper plate through a gap and a baffle plate. The structural configuration enables a mechanical separation of the nuts that are to be picked up from extra material (dust, dirt, foliage).

This power driven apparatus is guided by a steering rod, but is very large and can therefore be used only on appropriate surfaces. On uneven surfaces it is very difficult to pick up nuts that are lying in low spots on the ground; due to its size, the apparatus cannot be used where plants are close together.

It is therefore an object of the present invention to provide an apparatus of the aforementioned general type with which it is possible to satisfactorily use the apparatus not only on uneven ground but also where the plants are close together, all at a high collection efficiency.

BRIEF DESCRIPTION OF THE DRAWINGS

This object, and other objects and advantages of the present invention, will appear more clearly from the following specification in conjunction with the accompanying schematic drawings, in which:

FIG. 1 is a perspective view of a manually guided apparatus for collecting objects;

FIG. 2 illustrates the basic construction of the apparatus of FIG. 1;

FIG. 5 shows a mechanical barrier in the form of a brush;

FIG. 6 is an axial section through a pick-up drum embodied as a foam drum;

FIG. 6a is an end view onto the pick-up drum of FIG. 6;

FIG. 7 is an axial section through a pick-up drum embodied as a disk drum;

FIG. 7a is a view onto the end of the pick-up drum of FIG. 7

FIG. 8 is an axial section through a pick-up drum embodied as a finned drum;

FIG. 8a is an end view onto the end of the pick-up drum of FIG. 8;

FIG. 9 shows an operator removing the collection receptacle from the inventive apparatus;

FIG. 10 is a side view onto the inventive apparatus with the collection receptacle separated from the housing;

FIG. 11 shows the collection receptacle of FIG. 10 from behind;

SUMMARY OF THE INVENTION

Figure 3:
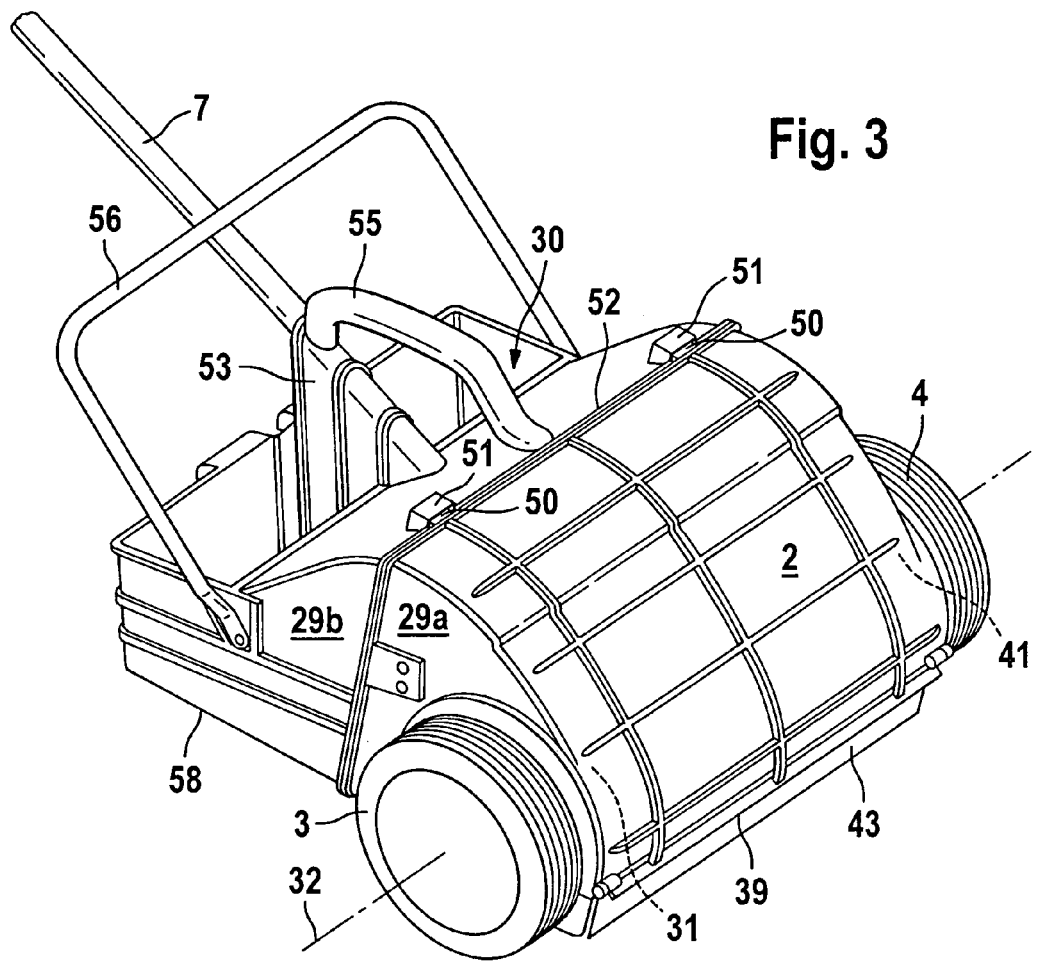
FIG. 3 is an enlarged illustration of the housing and the collection receptacle of FIG. 1.

The manually guided collection apparatus of the present application comprises a pick-up drum that is rotatably mounted in the drum chamber of a housing for picking up objects, whereby the pick-up drum is disposed approximately transverse to a direction of operation and is rotationally driven by a drive means. The housing has a wall section that extends over a width of the pick-up drum approximately at the level of an outer diameter of the drum. A ground support is disposed in the region of ends of the pick-up drum for supporting the housing on a ground surface. A collection receptacle for receiving picked-up objects is provided, with a collection channel providing communication for the objects between the drum chamber of the housing and the connection receptacle. The wall section of the housing and the pick-up drum cooperate with one another such that objects that are to be picked up are accelerated along the wall section toward the collection channel and are ejected out of the drum chamber along a trajectory into the collection chamber. A handle is operatively connected to the housing for moving the housing in the direction of operation.

The apparatus of the present application has no propelling mechanism, but rather is merely supported on the ground via ground supports disposed at the ends of the pick-up drum.

A wall section of the housing is disposed over the width of the pick-up drum approximately at the level of the outer diameter of the drum, so that the wall section can cooperate with the pick-up drum in such a way that fruits or nuts that are to be picked up are accelerated along the wall section from the pick-up drum in the direction toward the collection channel, and the fruits or nuts that are picked up are ejected along a trajectory out of the drum chamber and via the collection channel into the collection receptacle. The structural configuration that is selected enables a simple guidance of the apparatus over the ground, whereby the pick-up drum follows the unevenness of the ground and ensures a reliable collection of fruits and nuts.

Due to its structural configuration, the apparatus has a great maneuverability, so that it is also possible to use it where plants are close together. The effort that an operator has to expend when guiding and moving the inventive apparatus is low, so that it is possible to operate the apparatus over long periods of time without fatigue.

The ground supports advantageously have a common support axis that is disposed adjacent, and preferably parallel, to the axis of rotation of the pick-up drum. The position and arrangement of the ground supports that are selected in particular ensure that when working with the apparatus, the reliable collection of fruits, nuts or similar objects is also possible from low spots in the ground.

If the wall section continues into a conduction section, preferably a curved casting hood, it is also possible to gently pick up softer fruit or nuts without damaging the skin or shell. The curvature of the casting hood is configured to adapt to the curve of a parabolic trajectory of the object that is to be picked up, thus avoiding a blunt striking against the casting hood and hence damage to the objects that are to be picked up.

The guiding of the apparatus and the collection efficiency are influenced by the operational direction of rotation of the pick-up drum. The direction of operation is therefore selected such that the objects are conveyed along a trajectory outwardly past the pick-up drum and into the collection receptacle. This ensures an expedient operation.

In order to keep the ground contact of the pick-up drum within prescribed limits, the spacing of the axis of rotation of the pick-up drum from the support axis is expediently less than the diameter of the pick-up drum. In particular, the support axis is disposed in a region that is determined by a circle about the axis of rotation of the pick-up drum. The radius R of this circle is smaller than 0.4 times the diameter of the pick-up drum. The diameter of the circle is preferably less than 0.75 times the diameter of the pick-up drum.

It can be expedient for the support axis to be adjustable relative to the axis of rotation of the pick-up drum, so that the ground contact of the pick-up drum can be adjusted. The adjustment device is advantageously embodied in such a way that the relative spacing between the contact surface of the ground support and the outer surface of the pick-up drum is adjustable in a range of +/−10 mm. This ensures an adaptation to the fruits or nuts that are to be picked up.

The ground supports are advantageously embodied as wheels, whereby a wheel can expediently be disposed at each axial end of the pick-up drum. In this connection, the support axis is formed by the common axis of rotation of the wheels. It can be expedient to dispose several wheels at an end of the pick-up drum, for example via a pivotable rocker arm, the pivot axis of which forms the support axis. Pursuant to one suitable embodiment, the diameter of the wheels and the outer diameter of the pick-up drum are the same.

The apparatus advantageously has an operating width of no more than approximately 800 mm. In particular, an operating width of about 400 mm is provided, which has demonstrated a good collection capacity, even with very undulating ground and where plants are close together.

At its housing edge that faces the ground, the wall section that cooperates with the pick-up drum delimits an entry gap, which is expediently provided with a pick-up aid, which can be embodied as flexible flap, a flexible hollow profiled member such as a hollow profiled rubber member, or as a foam wedge. The wedge shape is advantageous where larger fruits or nuts, such as apples or the like, are to be collected, since the wedge glides on the apples which can thus pass into the working region of the pick-up drum.

The pick-up drum can be embodied as a finned drum, a disk drum or as a foam drum. In this connection, the pick-up drum is expediently composed of two drum sections between which is disposed a gear mechanism that preferably drives the drum shaft. For an expedient configuration, the handle is embodied as a guide rod that projects centrally out of the housing and enables an easy guidance of the apparatus. In a normal operating position, the guide rod is disposed at an angle of about 25° to 45° relative to the ground. It is to be understood that, depending upon the application and topography, the angular position can also deviate from this angular range.

If the guide rod is provided as a guide tube for a drive shaft, the drive means can be disposed at one end of the guide rod and the driven pick-up drum can be disposed at the other end of the guide rod. In this way, a good distribution of weight is achieved.

On that side that faces the guide rod, the housing can be essentially open, and is closed by the collection receptacle that is to be placed on the apparatus. Wall portions of the collection receptacle, in particular the bottom thereof, are expediently embodied in the manner of a grate. Extra material that is conveyed by the collection channel along with the fruits or nuts can thus again exit the collection receptacle and does not clog the receptacle.

The collection receptacle is placed upon the guide rod and extends over the guide rod, for which purpose a U-shaped receiver is centrally formed in the collection receptacle. The guide rod rests in the U-shaped receiver, whereby the center of gravity of the collection receptacle is disposed on the longitudinal central plane of the guide rod, with this plane symmetrically dividing the U-shaped receiver. Due to the inclined position of the guide rod, a collection receptacle that is placed upon the guide rod will rest against the open side of the housing under the effect of the force of gravity. By means of centering elements, the collection receptacle is fixed on the housing in such a way that it is fixed against rotation. The centering elements form a portion of a pivot bearing, the pivot axis of which is disposed approximately parallel to the axis of rotation of the pick-up drum. If the guide rod is placed upon the ground, the bottom of the collection receptacle sits on the ground; the pivot bearing permits a relative displacement between the collection receptacle and the casting hood, thus avoiding damage in the connection region of the collection receptacle.

Since the collection receptacle is open toward the top, the operator can at any time monitor the filling state of the receptacle. During operation, exchange collection receptacles are expediently kept available by a helper, thus enabling an operation that is nearly free of interruption.

The extra material is separated from the fruits and nuts that are to be collected by means of a separation device, which can be formed ahead of the pick-up drum in the form of a grate or grille, or can be provided between the drum chamber and the collection receptacle as a mechanical barrier. The mechanical barrier is preferably formed by a curtain that in turn is formed, for example, of round cords that hang down by the force of gravity. In this connection, a mechanical barrier can be formed on the collection receptacle.

Further specific features of the present application will be described in detail subsequently.

DESCRIPTION OF SPECIFIC EMBODIMENTS

Referring now to the drawings in detail, the inventive apparatus illustrated in FIGS. 1 to 18 serves for collecting objects, especially fruits and nuts, including chestnuts, olives, coffee berries, or the like. With an appropriate configuration, it is also possible to collect apples (cider apples) or similar fruit.

Figure 4:
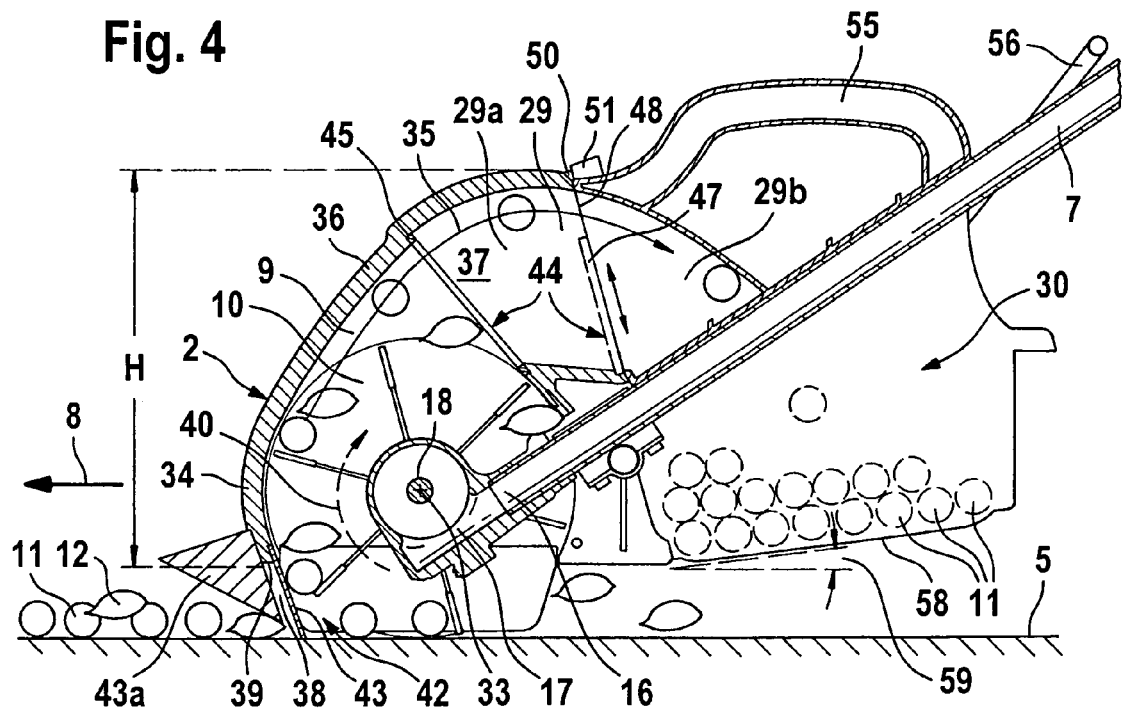
FIG. 4 is a cross-sectional view through the housing and the collection receptacle of the apparatus of FIG. 1.

The apparatus 1 essentially comprises a housing 2, which is supported on the ground 5 via ground supports 3, 4 that are preferably embodied as wheels. Disposed on a side of the housing 2 that faces an operator 6 (see FIG. 9), centrally relative to the housing 2, is a handle 7 by means of which the apparatus 1 can be moved back and forth in the direction of operation 8. In the illustrated embodiment, the handle 7 is in the form of a guide rod. As shown in FIG. 4, provided in the housing 2 is a drum chamber in which is rotatably mounted a pick-up drum 10 for receiving objects 11, 12. The pick-up drum 10 is disposed approximately transverse to the direction of operation 8 and is rotatably driven by a drive means 13. The axis of rotation 33 of the pick-up drum 10, and the direction of operation 8, preferably form an angle of 90°; however, positions that deviate from this angle can also be advantageous, whereby the angle can in particular vary greatly from 90°.

To drive the pick-up drum 10, the guide rod 7 that forms a handle is preferably configured as a guide tube 7a (FIG. 2) in which is mounted a drive shaft 7b. Provided at one end 15 of the guide rod 7 is the drive means 13, while the pick-up drum 10 is rotatably driven at the other end 16.

Pursuant to a preferred embodiment of the invention, provided at the end 16 of the guide rod 7 disposed in the housing 2, is a gear mechanism 17 that directly drives the central shaft 18 of the pick-up drum 10. The gear mechanism 17 is preferably centrally disposed in the pick-up drum 10, which in turn is preferably composed of two drum sections on either side of the gear mechanism 17. In this connection, the drum sections on both sides of the gear mechanism 17 have an identical configuration, so that the guide rod 7 can easily be centrally disposed in the housing 2.

As shown in FIGS. 6, 6a, 7, 7a and 8, 8a, various configurations of the pick-up drum 10 are possible. In the embodiment of FIG. 6, the pick-up drum 10 is in the form of a foam drum 10a, whereby, as shown in FIG. 6a, the foam drum 10a is made of solid material without any hollow spaces. The fruits or nuts that are to be collected are rolled against the wall section 34, so that any dirt that might adhere is loosened.

In the embodiment of FIG. 7, the pick-up drum 10 is embodied as a disk drum 10b. Disposed on a central shaft tube 18a are a plurality of preferably resilient disks 19 that are axially spaced by a distance a from one another, and preferably at the same distance a from one another. As shown in FIG. 7a, the disks are embodied as solid disks. For collection, the fruits or nuts are retained in a wedged manner between adjacent disks 19, are accelerated along the wall portion 34, and are conveyed along the hurling or casting hood 36 into the collection channel 29. In this connection, the disk drum 10b picks up only little extra material.

To reliably pick up fruits or nuts of different sizes, the disks 19a can expediently be disposed at an angle b that is other than 90°. Thus, adjacent disks 19a have different spacings over the periphery, namely a smaller spacing $Y_1$ in a first peripheral section for picking up smaller fruits or nuts, and a greater spacing $Y_2$ in a second peripheral section for picking up larger fruits and nuts.

In the embodiment of FIG. 8, the pick-up drum is embodied as a finned drum 10c. Provided in the peripheral direction, on a central shaft tube 18a, are individual fins 20 that, as shown in FIG. 8, extend over the entire width of the shaft tube 18a. Distributed over the periphery are a plurality of fins 20 that have the same spacing b relative to one another; an even number of fins is preferred. The fruits or nuts that are to be collected are scraped up from the ground by the preferably resilient fins 20, i.e. are thrust over the ground onto the wall section 34 where they are then accelerated by a fin 20 and are conveyed along the casting hood 36.

In the illustrated embodiment, provided as the drive means 13 is an internal combustion engine 21 having a small piston displacement of less than 300 cm$^3$ that is disposed at the end 15 of the guide rod 17 and that can be embodied as a two-cycle engine, a four-cycle engine or the like. To operate the internal combustion engine 21, disposed in the region of the end 15 is an operating handle 22 that carries a gas lever 23, a throttle lock 24 and further control elements 25 for operating the internal combustion engine. Furthermore, a hand or finger guard 26 can be provided on the operating handle 22.

To guide the inventive collection apparatus, it is expedient to provide on the guide rod 7 a second handle for the other hand of the operator 6. In the illustrated embodiment, this second handle is embodied as a loop-shaped handle 27 that is mounted ahead of the operating handle 22. One hand of the operator 6 grasps the operating handle 22 while the other hand grasps the loop-shaped handle 27, so that the operator can reliably guide the apparatus 1 with both hands.

As can be seen in particular in FIGS. 4 and 10, that side 28 of the housing 2 that faces the guide rod 7 is essentially open and is closed off by an exchangeable collection receptacle 30 that is to be placed on the housing 2. The collection receptacle 30 delimits the drum chamber 9 and serves for collecting the objects 11, 12 received in the housing 2 from the pick-up drum 10.

To transfer the objects 11, 12 from the drum chamber 9 into the collection receptacle 30, a collection channel 29 is provided, which essentially extends over the entire width of the pick-up drum 10 or housing 2. In the illustrated embodiment, a first section 29a of the collection channel 29 is formed in the housing 2 and a second section 29b is formed in the collection receptacle 30. In this connection, the collection receptacle 30 extends essentially over the entire height H of the housing 2 (FIG. 4), and is covered in the region of the collection channel 29 by a top.

The ground supports, which are embodied as the wheels 3, 4, are disposed in the region of the axial ends 31, 41 of the pick-up drum 10, whereby the wheels preferably have a common axis of rotation, which forms the support axis 32. The axis of rotation of the wheels 3, 4, and the axis of rotation 33 of the pick-up drum (FIG. 4), are expediently disposed approximately parallel to one another, and in particular closely adjacent to one another. The purpose of this is so that when the housing 2 is pivoted about the axis of rotation 32, the distance w of the pick-up drum 10 from the ground (FIG. 2) remains essentially unchanged, so that good collection conditions are maintained even on slopes or in depressions or low spots in the ground. The axis of rotation 32 of the wheels 3, 4, and the axis of rotation 33 of the pick-up drum 10, preferably coincide, in other words are coaxial.

To achieve a good collection of the fruits or nuts, the diameter D1, D2 of the pick-up drum 10 expediently corresponds approximately to the diameter L of the wheels 3, 4 (see FIG. 2). It can be expedient for the support axis 32, i.e. the axis of rotation 33 of the pick-up drum 10, to be adjustable. As a result, the relative distance w between the contact surface 70 of the wheels 3, 4 and the outer surface 71 of the pick-up drum 10 is adjustable in a range of advantageously +/−10 mm. The position of the pick-up drum 10 relative to the ground supports or wheels is preferably adjustable, so that the engagement depth of the pick-up drum 10 relative to the ground 5 can be adapted to the fruits or nuts 11, 12 that are to be collected.

As shown in FIG. 4, the wall section 34 rests approximately on the outer diameter of the pick-up drum 10, in other words it is configured so as to be adapted to the outer contour of the pick-up drum 10. The wall section 34 of the housing 2 that is disposed on the outer diameter of the pick-up drum 10 is disposed toward the front relative to the operator 6, and cooperates with the pick-up drum 10 in such a way that objects 11, 12 that are to be collected are accelerated or thrown upwardly by the pick-up drum 10 along the front wall section 34 in the direction toward the collection channel 29. Thus, the objects 11, 12 that are picked up are ejected or shot out of the drum chamber 9, along a parabolic path or trajectory 35, and into the collection receptacle 30 via the collection channel 29. That region of the housing 2 adjoining the wall section 34 is a curved conduction section in the manner of the hurling or casting hood 36. In this connection, the configuration of the hood 36 is adapted to the shape of the trajectory 35 of the objects 11 that have been picked up, and extends in an arc-shaped manner from the front wall section 34 in a direction toward the collection channel 29 and the collection receptacle 30.

The entry opening 37 into the collection channel 29 is disposed in the region above the pick-up drum 10, as illustrated in FIG. 4.

The objects 11 (fruit or nuts) and 12 (extra material such as foliage) lying on the ground 5 are picked up by the pick-up drum 10, for which purpose an entry gap 38 is formed between a lower edge 39 of the housing 2 and the ground 5. The entry gap 38 is of such a size that the objects 11, 12 that are to be collected can pass into the working region of the drum 10, whereby the pick-up drum 10 rotates in the direction of the arrow 40. The arrow direction 40 corresponds to the transport direction of the objects 11, 12 from the wall section 34, via the casting hood 36, toward the collection channel 29. The direction of rotation 40 is therefore selected such that the objects 11, 12 are conveyed along the trajectory 35 past the pick-up drum 10 into the collection receptacle 30.

To ensure a reliable picking-up of the objects 11, 12 in the region of the entry gap 38, a pick-up aid 42 is provided that can be suitably embodied in various ways. In a first embodiment, the pick-up aid can be in the form of a flexible flap 43, which permits entry of the objects 11, 12 into the working region of the pick-up drum 10, yet prevents the objects from again being ejected through the entry gap 38. The objects that pass into the work region of the pick-up drum 10 are conveyed upwardly of the flap 43 and along the wall section 34 in the direction toward the curved casting hood 36.

It can be expedient to provide as the pick-up aid 42 a receiving wedge 43a that is operative in particular when a pile of objects 11 is encountered and which forces a separation of the pile before entry into the region of the pick-up drum 10 is possible. The receiving wedge 43a can be embodied as a simple hollow profiled rubber member, or also as a foam wedge. In particular when large fruit or nuts are to be picked up, a wedge is advantageous. It either deforms to such an extent until the larger fruit or nuts can enter into the work region of the pick-up drum 10, or it can glide upon the fruit or nuts, thereby raising the housing of the apparatus so that the fruit or nuts can enter.

Provided between the drum chamber 9 and the collection receptacle 30, for the sorting of the objects 11, 12 into fruits or nuts 11 and extra material 12, is a separation device that expediently comprises a mechanical barrier 44. In a first embodiment, as illustrated in FIG. 5, the mechanical barrier 44 comprises a frame 45, the bristles 46 of which hold back the lighter extra material 12, yet allow the heavier fruits or nuts 11 to pass. Such a bristle frame 45 can be provided at the entry opening 37 of the collection channel 29 in the housing 2, as indicated in FIG. 4.

In another embodiment of a separation device in the form of a mechanical barrier 44, a partition 47 is provided that extends over the entire width of the collection channel 29 and can expediently be disposed in the plane between the collection receptacle 30 and the housing 2. In the end region of the casting hood 36, this partition 47 leaves open a narrow separation gap 48 through which the fruits or nuts 11 that are hurled along the casting hood can pass into the collection receptacle 30. The lighter extra material 12 has a different, lower casting parabola and therefore strikes the partition 47, whereupon it falls downwardly out of the housing 2. To adjust the separation effect, the partition 47 is displaceable in the direction of the double arrow, as a result of which the separation gap 48 is adjustable. Other mechanical barriers, for example in the form of chain curtains, baffle plates, or the like can also be expedient.

The collection receptacle 30 closes the open side 28 of the housing 2 that faces the guide rod 7, whereby the height S (FIG. 10) of the connection side of the collection receptacle 30, and the height G of the side 28 of the housing 2, are approximately equal to one another. The facing sides 28 and 49 are congruently disposed on one another, whereby the second section 29b of the collection channel 29, which is formed in the collection receptacle 30, adjoins the first section 29a of the collection channel in a correctly positioned manner.

The collection receptacle 30 is not secured to the housing 2 in the manner of a screw connection or the like. Rather, the collection receptacle rests against the open side 28 of the housing 2 under the effect of the force of gravity. For a correct positioning, centering elements 50 are disposed on the upper edge 52 of the collection receptacle 30. As shown in FIGS. 3 and 9, a respective centering element 50 is provided on a longitudinal side of the collection receptacle 30 on each side of the guide rod 7. The centering elements 50 engage in receiving means 51 that are provided on the housing 2 in the region of the upper edge of the casting hood 36, and thus ensure a correct positioning and a fixation that is secured against rotation. The centering elements 50 and the receiving means 51 form a pivot bearing 63 (see FIG. 12).

Although the centering elements 50 have been described as being disposed on the collection receptacle 30, and the receiving means 51 have been described as being disposed on the housing 2, it is to be understood that the reverse arrangement would also be conceivable.

As shown in FIGS. 9 to 11, the collection receptacle 30 is placed on the guide rod 7 and extends over it. For this purpose, a U-shaped receiver 53 is provided in the collection receptacle 30 and divides the latter into partial receptacles 30a and 30b. In this connection, the U-shaped receiver 53 is disposed centrally between the partial receptacles 30a and 30b. The collection receptacle 30 is symmetrically configured relative to a central plane 54 that splits the U-shaped receiver 53. To facilitate carrying and moving of the collection receptacle 30, two handles 55 and 56 are provided, whereby the handle 55 connects the U-shaped receiver 53 with the front edge 52 of the receptacle. When viewed from above, it can be seen that the handle 55 is disposed in the central plane 54. The second pivotable handle 56 is fastened to the outer side walls of the partial receptacles 30a and 30b and primarily serves for the removal of the full collection receptacle from the housing 2.

The structural configuration is such that the center of gravity of the collection receptacle 30 is disposed on the longitudinal central plane 54 of the receptacle, and preferably also on the longitudinal central axis 57 of the guide rod 7.

To place the collection receptacle 30 on the housing 2, it is merely necessary to place the receptacle on the guide rod 7, whereby the guide rod 7, to the extent that is held by the operator, is disposed at an angle K relative to the ground 5. In this connection, the weight component GK of the collection receptacle 30 effects a bearing force A that extends in the direction of the guide rod 7, so that the collection receptacle 30, which in FIG. 10 is placed upon the guide rod 7 above the housing 2, slides downwardly toward the housing under the effect of the partial weight component or bearing force A. Since when the collection receptacle 30 is empty, the center of gravity is disposed on or below the longitudinal central axis 57, the collection receptacle 30 is aligned in the correct position relative to the open side 28 of the housing 2 due to the symmetrical configuration of the receptacle, so that when the collection receptacle slides downwardly, the centering elements 50 engage in the receiving means 51 and fix the rotational position of the collection receptacle 30 relative to the housing 2. The collection receptacle 30, which is displaceable on the guide rod 7 and is pivotable about the longitudinal central axis 57, is secured against rotation by the presence of the centering elements 50 and the receiving means 51, and is held against the open side 28 of the housing 2 due to the effective partial weight component A.

FIGS. 12 to 15 illustrate the pivot bearing 63 in detail, whereby provided on the upper edge 52 of the collection receptacle 30 are the centering elements 50, which comprise short pins 50a, the free ends of which face one another. The receiving means 51 comprise a U-shaped groove 51a that is open at both ends and that faces the pin 50a.

If the collection receptacle 30 is placed upon the guide rod 7, due to the angle K relative to the ground 5 the weight component GK effects a directional component A in the direction toward the housing 2, due to which the collection receptacle 30, which is placed upon the guide rod 7 so as to be able to swing, slides downwardly. To ensure a clean mounting of the pins 50a of the centering elements 50 into the U-shaped grooves 51a of the receiving means 51, a guide rail 64 (FIG. 12) is secured in the lower region of the guide rod 7; the guide rail fixes the rotational position of the collection receptacle 30 on the guide rod 7. Due to the guide rail 64, the pins 50a of the collection receptacle 30 slide in a correctly positioned manner into the two receiving means 51 to the right and the left of the central guide rod 7, so that the collection receptacle 30 is held on the housing 2 in a correctly positioned manner.

This connection of the collection receptacle 30 to the housing 2, which is embodied without the need for securement elements that have to be separately actuated, ensures that when forces are exerted upon the collection receptacle 30, the latter can automatically deflect in order to avoid damage. The bottom 58 of the collection receptacle 30, in its connected position on the housing 2, is expediently disposed at an angle 59 relative to the lower edge 39 of the housing, so that the bottom 58 of the collection receptacle 30 rises toward the operator. This gives more space for movement to the operator when fruits or nuts are being picked up on slopes or the like.

When the operator lays the guide rod 7 on the ground, first the bottom 58 of the collection receptacle 30 rests upon the ground. As the guide rod 7 is pivoted further toward the ground, the housing 2 moves relative to the collection receptacle 30. Due to the U-groove 51a in the receiving means 51, the pin 50a can move along the U-groove and can exit at the other, upper end of the receiving means 51. This prevents damage to the fixation means of the collection receptacle 30 on the housing 2. The collection receptacle 30 can pivot about the pivot axis 65 (FIG. 13) defined by the pins 50a and the receiving means 51.

Figure 12:
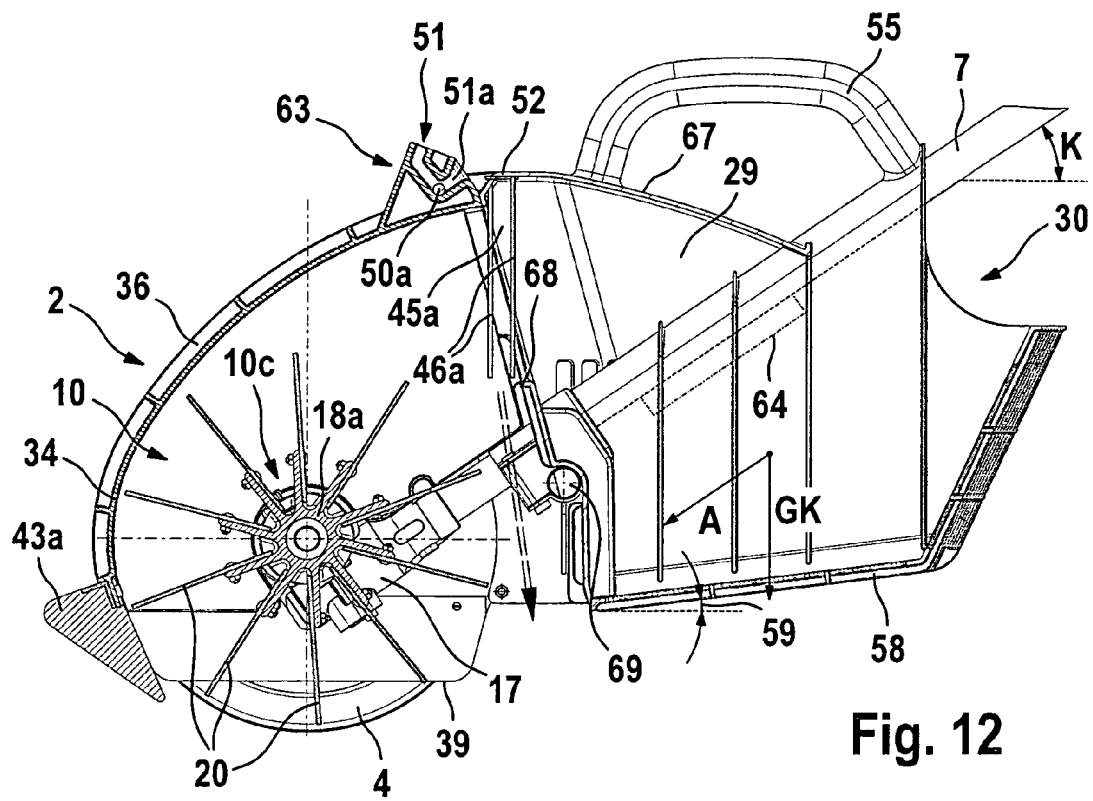
FIG. 12 is a cross-sectional view through an inventive apparatus in a view similar to that of FIG. 4.

As shown in FIG. 12, the finned drum 10c comprises a rigid, star-shaped driven shaft tube or main body 18a on the ribs of which are secured the flexible fins 20. In the illustrated embodiment, the pick-up aid 42 is a foam wedge 43a. The casting hood 36 is configured so as to be adapted to the trajectory of an object that is to be picked up, and guides the object in the direction toward the collection receptacle 30. The casting hood 36, which forms a conducting section, directly adjoins the wall section 34 that receives the objects.

In the illustrated embodiment, the conduction wall of the casting hood 36 ends directly at the entrance to the collection channel 29, which in the embodiment of FIG. 12 is formed exclusively at the collection receptacle 30. For this purpose, the collection receptacle 30 is partially covered by a top 67.

Formed at the inlet to the collection receptacle 30 is a curtain 45a of round cords 46a that, as shown in particular in FIG. 12, are disposed in two rows one behind the other in the direction of movement of the objects. One end of the round cords 46a is secured in the region of the top 67 and hangs approximately vertically downwardly under the effect of gravity. The round cords 46a end prior to the lower edge 68 of the collection channel 29, so that extra material that is retained at the curtain 45a can exit downwardly out of the housing, as indicated by the dashed-line arrow.

The collection receptacle 30 is supported below the guide rod 7 near the gear mechanism 17 on a transverse bar 69, whereby the housing of the collection receptacle 30 is embodied in such a way that it is easily seated on the transverse bar 69.

Figure 13:
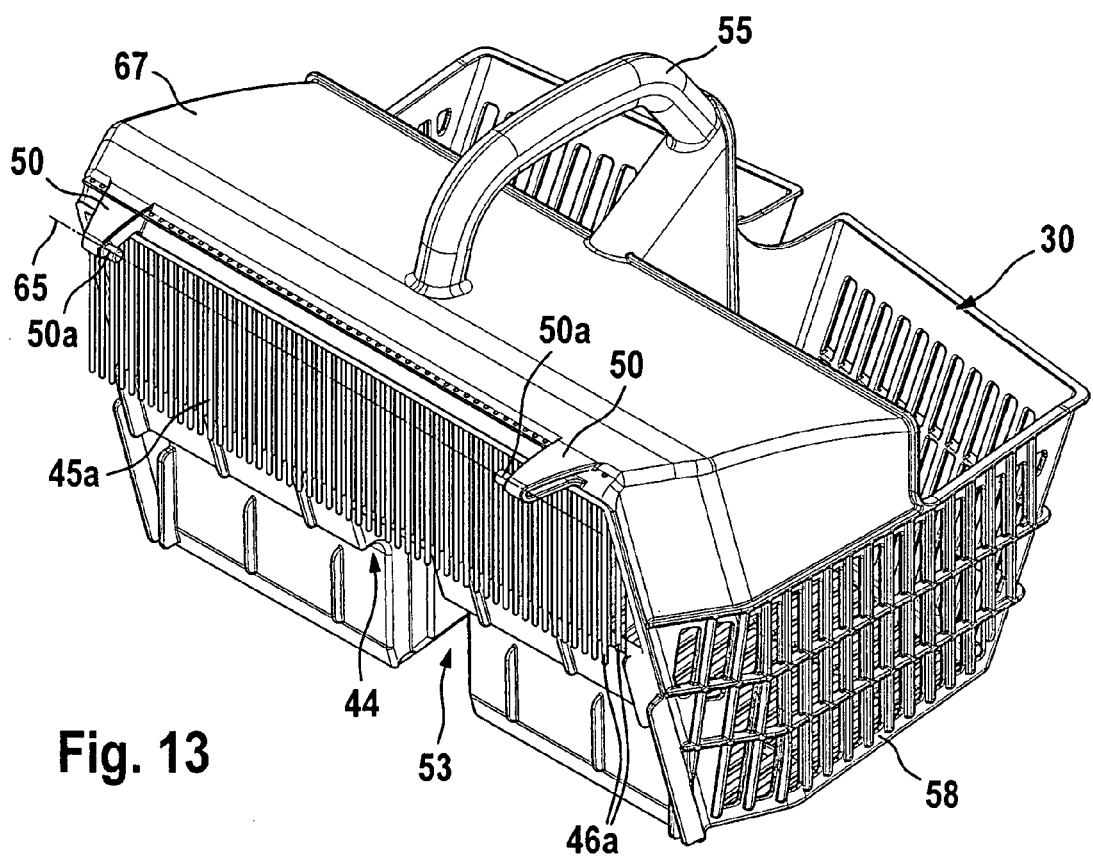
FIG. 13 is a perspective view of the collection receptacle.
Figure 14:
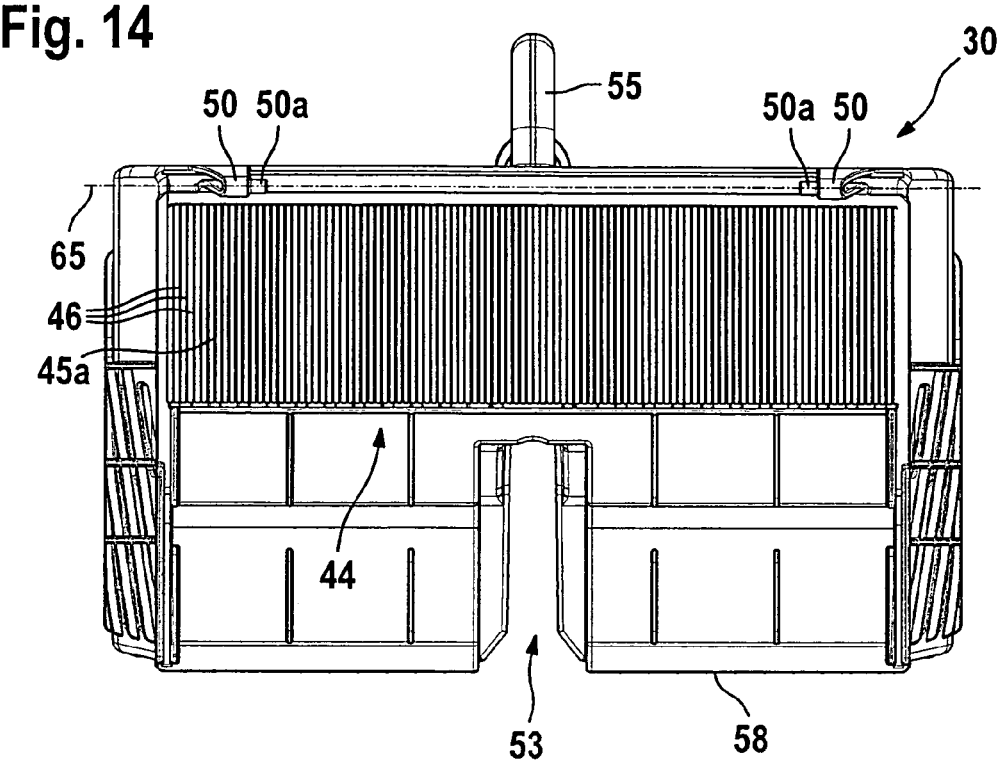
FIG. 14 is a view of the collection receptacle of FIG. 13 as seen from the housing side.
Figure 15:
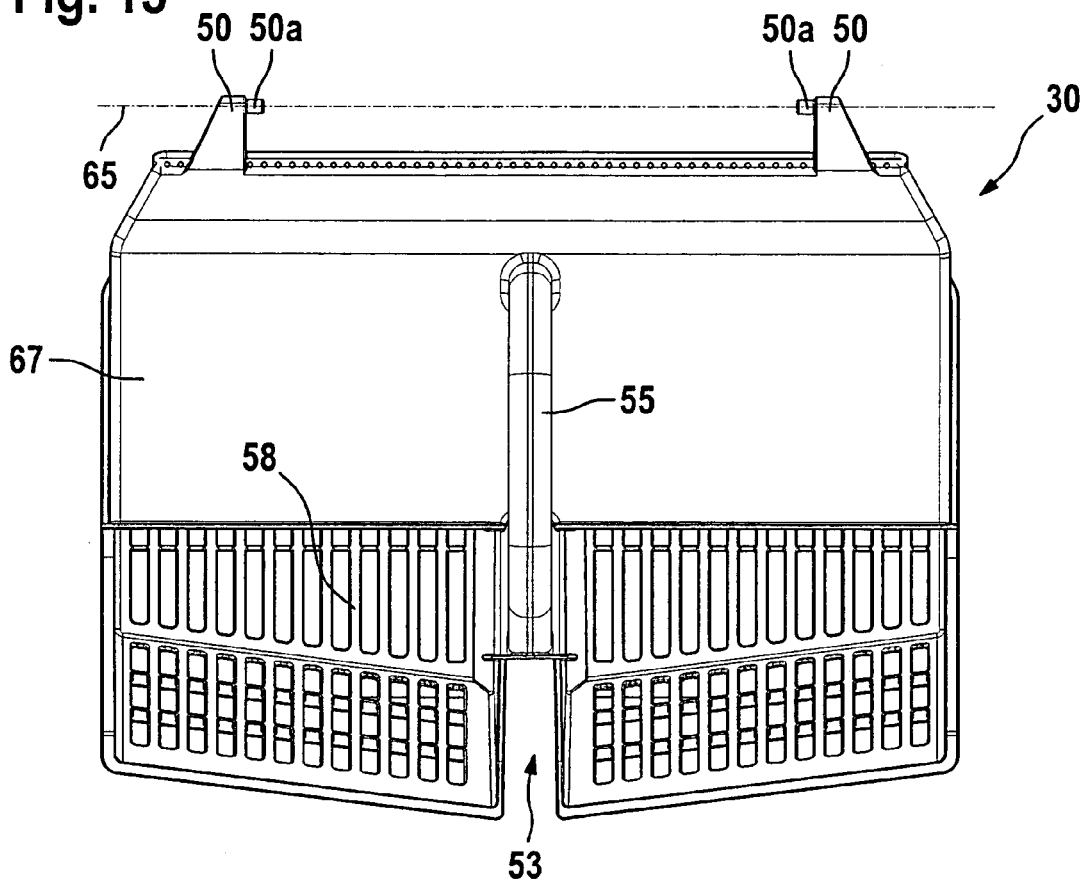
FIG. 15 is a plan view of the collection receptacle of FIG. 13.

As shown in FIGS. 13 to 15, the bottom 58 of the collection receptacle 30 is embodied in the manner of a grate, so that despite the mechanical barrier 44, extra material that enters through the curtain 45a can again exit through the grate. In this way, predominantly the fruit or nuts that are to be picked up are collected in the collection receptacle 30, and the amount of extra material is low. The side walls of the collection receptacle 30 are also in the form of a grate, so that with the exception of the front wall that faces the housing 2 and the top 67 of the collection receptacle, all of the wall portions are in the form of a grate. The grate-like configuration can also be used as a separation device that can be provided by itself or in addition to the mechanical barrier 44.

Figure 16:
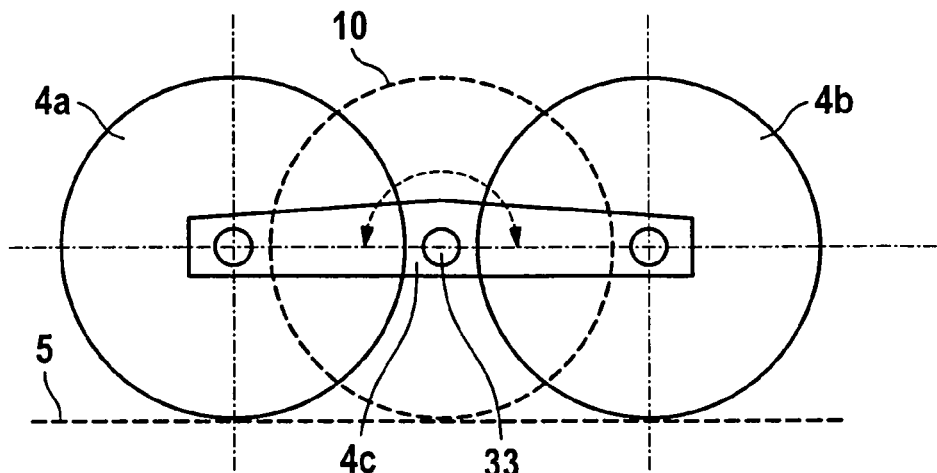
FIG. 16 shows a ground support in the form of two wheels disposed at an end of the pick-up drum.

In the embodiment of FIG. 16, two wheels 4a, 4b are provided as the ground support at an axial end of the pick-up drum 10. The wheels are rotatably held on a common rocker arm 4c that in turn is pivotably held on the shaft of the pick-up drum 10, resulting in a good movability and a good cross country operation.

Figure 17:
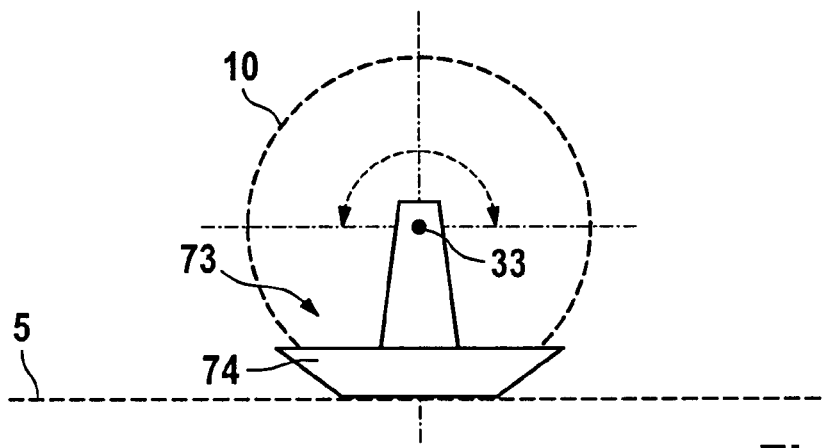
FIG. 17 shows a ground support in the form of a skid.

In the embodiment of FIG. 17, the pick-up drum 10 is supported relative to the ground support 73 in the form of a skid 74. The skid is secured to the apparatus so as to be fixed against rotation, so that the fruit or nut collector can be guided over the ground 5 similar to a sled.

Figure 18:
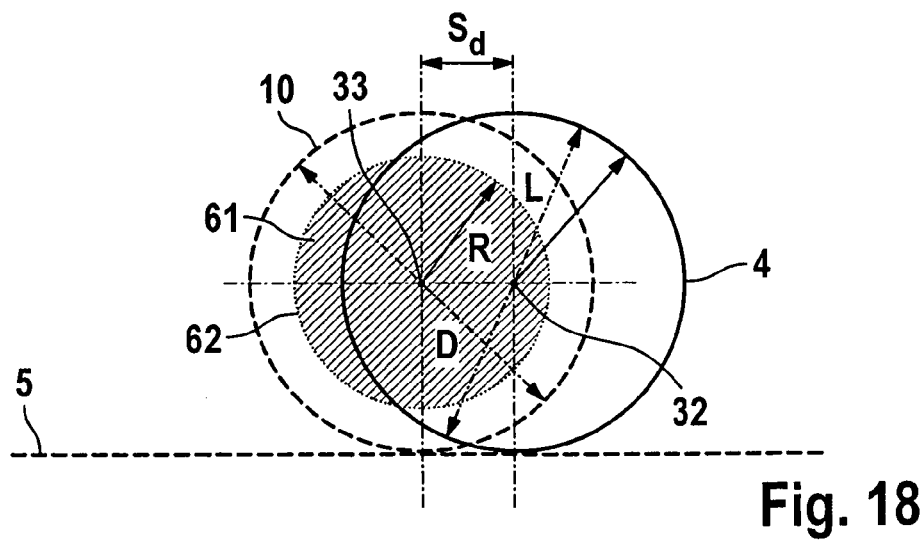
FIG. 18 shows a wheel having an axis of rotation spaced from the axis of rotation of the pick-u drum.

In the embodiment of FIG. 18, a pick-up drum 10 is shown where the wheel 4, which is held on the axial end of the pick-up drum 10, has the same diameter. The apparatus is embodied in such a way that the support axis 32, which forms the axis of rotation of the wheel 4, is disposed at a distance $S_d$ relative to the axis of rotation 33 of the pick-up drum 10, whereby the distance $S_d$ is less than the diameter D of the pick-up drum 10. The support axis 32, i.e. the axis of rotation of the wheel 4, is preferably disposed in a region 61 that is defined by a circle 62 having the radius R about the axis of rotation 33 of the pick-up drum 10. In this connection, the radius R of the circle 62 is less than 0.4 times the diameter D of the pick-up drum 10.

The collection receptacle 30 is expediently open toward the top, so that merely by visually checking the operator 6 can at any time ascertain whether it is necessary to empty the receptacle. In this connection, in order to be able to operate in an uninterrupted manner, a helper can easily and rapidly remove the collection receptacle 30 and replace it with an empty one without down time occurring due to the need to loosen or close securing means.

As shown in FIG. 9, the inventive apparatus has an operating width Z that is expediently less than 800 mm and preferably approximately 400 mm. Such an apparatus is convenient and easy to move, so that even in terrain where there are no paths a reliable picking up of fruits and nuts is possible.

The guide rod is preferably embodied as a segmented guide rod that is assembled via the clamp coupling 60. This provides the possibility of also using the upper section of the guide rod 7, with the drive means 13, for other devices that can be connected to the clamp coupling 60.

Instead of the internal combustion engine 21, a flexible drive shaft can also be connected as the drive means, so that the engine unit can be embodied, for example, as a unit that can be carried on the back.

The specification incorporates by reference the disclosure of German priority document 10 2005 006 422.1 filed 12 Feb. 2006.

The present invention is, of course, in no way restricted to the specific disclosure of the specification and drawings, but also encompasses any modifications within the scope of the appended claims.

What we claim is:

1. A manually guided apparatus for collecting objects, comprising:
    a housing having a drum chamber;
    a pick-up drum rotatably mounted in said drum chamber for picking up objects, wherein said pick-up drum is disposed approximately transverse to a direction of operation, wherein said pick-up drum is adapted to be rotationally driven by a drive means, and wherein said housing has a wall section that extends over a width of said pick-up drum approximately at a level of an outer diameter of said pick-up drum;
    a ground support disposed in the region of ends of said pick-up drum for supporting said housing on a ground surface;
    a collection receptacle for receiving objects, wherein a collection channel provides communication for said objects between said drum chamber of said housing and said collection receptacle, wherein said wall section of said housing and said pick-up drum cooperate with one another such that objects that are to be picked up are accelerated along said wall section toward said collection channel and are ejected out of said drum chamber along a trajectory into said collection receptacle; and
    a handle operatively connected to said housing for moving said housing in said direction of operation, wherein said collection receptacle closes off a side of said housing that faces said handle, wherein said collection receptacle delimits said drum chamber, and wherein said collection receptacle is adapted to be placed on said handle, which is in the form of a guide rod, and to extend at least partially over said guide rod.

2. An apparatus according to claim 1, wherein a respective ground support is disposed at each end of said pick-up drum, wherein said ground supports have a common support axis, and wherein said support axis and an axis of rotation of said pick-up drum are disposed adjacent and approximately parallel to one another.

3. An apparatus according to claim 1, wherein said wall section of said housing merges into a conduction section that is embodied as a curved casting hood having a curvature adapted to the curve of a parabolic trajectory of an object that is to be picked up.

4. An apparatus according to claim 1, wherein said pick-up drum has a direction of rotation such that said objects are conveyed along said trajectory past said pick-up drum and into said receptacle.

5. An apparatus according to claim 2, wherein said support axis is disposed at a distance from said axis of rotation of said pick-up drum that is less than a diameter of said pick-up drum, and wherein said support axis is disposed in a region that is formed by a circle having a radius of less than 0.4 times the diameter of said pick-up drum about said axis of rotation of said pick-up drum.

6. An apparatus according to claim 2, wherein said support axis of said ground supports and said axis of rotation of said pick-up drum are disposed closely adjacent to one another or coincide with one another.

7. An apparatus according to claim 2, wherein said support axis and said axis of rotation of said pick-up drum are adjustable relative to one another.

8. An apparatus according to claim 1, wherein a respective ground support is disposed at each end of said pick-up drum, wherein said ground supports are rotatable wheels, wherein a support axis of said ground supports forms an axis of rotation of said wheels, and wherein a diameter of said wheels corresponds approximately to a diameter of said pick-up drum.

9. An apparatus according to claim 1, wherein a contact surface of said ground support and an outer surface of said pick-up drum have a relative spacing to one another of up to +/−10 mm.

10. An apparatus according to claim 1, wherein said apparatus has an operating width of less than 800 mm, preferably approximately 400 mm.

11. An apparatus according to claim 1, wherein on an edge of said housing that faces said ground surface said wall section that cooperates with said pick-up drum delimits an entry gap, wherein a pick-up aid is provided in the region of said entry gap, and wherein said pick-up aid is adapted to be embodied as a flexible hollow profiled member or a foam wedge.

12. An apparatus according to claim 1, wherein said pick-up drum is embodied as a foam drum, and wherein objects that are to be picked up are swept up.

13. An apparatus according to claim 1, wherein said pick-up drum is embodied as a disk drum, wherein objects that are to be picked up are picked up in a clamped manner, and wherein said disk drum is provided with disks (19a) that are disposed next to one another at an angle (v).

14. An apparatus according to claim 1, wherein said pick-up drum is embodied as a finned drum, and wherein objects that are to be picked up are scraped up.

15. An apparatus according to claim 1, wherein said pick-up drum is composed of two approximately identical drum sections, and wherein a gear mechanism is disposed between said drum sections.

16. A manually guided apparatus for collecting objects, comprising:
    a housing having a drum chamber;
    a pick-up drum rotatably mounted in said drum chamber for picking up objects, wherein said pick-up drum is disposed approximately transverse to a direction of operation, wherein said pick-up drum is adapted to be rotationally driven by a drive means, and wherein said housing has a wall section that extends over a width of said pick-up drum approximately at a level of an outer diameter of said pick-up drum;
    a ground support disposed in the region of ends of said pick-up drum for supporting said housing on a ground surface;
    a collection receptacle for receiving objects, wherein a collection channel provides communication for said objects between said drum chamber of said housing and said collection receptacle, wherein said wall section of said housing and said pick-up drum cooperate with one another such that objects that are to be picked up are accelerated along said wall section toward said collection channel and are ejected out of said drum chamber along a trajectory into said collection receptacle; and a handle operatively connected to said housing for moving said housing in said direction of operation, wherein said pick-up drum is a driven pick-up drum, wherein said handle is embodied as a guide rod that is embodied as a guide tube for a drive shaft, wherein said drive means is disposed at one end of said guide rod, and wherein said driven pick-up drum is disposed at another end of said guide rod.

17. An apparatus according to claim 1, wherein said collection receptacle is provided with a U-shaped receiver, wherein said guide rod is disposed in said receiver, wherein the center of gravity of said collection receptacle is disposed on a longitudinal central plane of said collection receptacle that symmetrically divides said receiver, wherein said housing is provided with receiving means, and wherein said collection receptacle rests against said housing under the effect of a partial weight component and is also positioned on said housing via said receiving means.

18. An apparatus according to claim 1, wherein said guide rod is provided with a guide rail that is adapted to guide said collection receptacle in a correctly positioned manner on said housing.

19. An apparatus according to claim 17, wherein said receiving means is part of a pivot bearing having a pivot axis that is disposed approximately parallel to an axis of rotation of said pick-up drum.

20. An apparatus according to claim 1, wherein said collection channel is provided with an entry opening that is disposed approximately above said pick-up drum.

21. An apparatus according to claim 1, wherein a separation device is provided for separating objects that are to be picked up from extra material, and wherein said separation device is formed by a mechanical barrier that is adapted to be disposed ahead of said pick-up drum.

22. An apparatus according to claim 21, wherein said separation device is formed by a grate or grille having adjacent elongated bars that are adapted to extend in said direction of operation, and wherein a separation gap is formed between said adjacent elongated bars.

23. An apparatus according to claim 21, wherein said separation device is disposed between said drum chamber (9) and said collection receptacle and preferably comprises a partition, a brush, or a curtain.

24. An apparatus according to claim 16, wherein said guide rod projects centrally from said housing.

* * * * *